United States Patent
Gofron et al.

(10) Patent No.: US 9,693,502 B2
(45) Date of Patent: Jul. 4, 2017

(54) ACTIVE HEADER CONTROL

(71) Applicant: AGCO Corporation, Hesston, KS (US)

(72) Inventors: Marian Gofron, Hesston, KS (US); Steven R. Tippery, Gretna, NE (US)

(73) Assignee: AGCO Corporation, Duluth, GA (US)

( * ) Notice: Subject to any disclaimer, the term of this patent is extended or adjusted under 35 U.S.C. 154(b) by 8 days.

(21) Appl. No.: 14/857,382

(22) Filed: Sep. 17, 2015

(65) Prior Publication Data

US 2016/0113200 A1 Apr. 28, 2016

Related U.S. Application Data (60) Provisional application No. 62/068,039, filed on Oct. 24, 2014.

(51) Int. Cl.
*A01D 41/14* (2006.01)
*A01B 73/00* (2006.01)

(52) U.S. Cl.
CPC ............ *A01D 41/141* (2013.01); *A01B 73/00* (2013.01); *A01D 41/145* (2013.01)

(58) Field of Classification Search
CPC .... A01D 41/14; A01D 41/141; A01D 75/285; A01D 75/287; A01D 41/145; B60G 9/02; B60G 21/007; B60G 2200/322; B60G 2200/422; B62D 57/024; A01B 73/00
USPC ........... 172/2–11; 56/10.2 A–10.2 E, 10.2 R, 56/15.5, 208; 280/6.154; 701/50
See application file for complete search history.

(56) References Cited

U.S. PATENT DOCUMENTS

| | | | | |
|---|---|---|---|---|
| 5,147,172 A | | 9/1992 | Hosseini | |
| 5,704,200 A | * | 1/1998 | Chmielewski, Jr. . | A01D 41/141 56/10.2 E |
| 5,890,870 A | | 4/1999 | Berger et al. | |
| 6,615,569 B1 | * | 9/2003 | Carlz ................... | A01D 41/141 172/2 |
| 6,615,570 B2 | * | 9/2003 | Beck .................... | A01D 41/141 56/10.2 E |
| 7,748,203 B2 | * | 7/2010 | Solbrack .............. | A01D 75/285 280/6.154 |

(Continued)

FOREIGN PATENT DOCUMENTS

EP 0433669 A1 6/1991

OTHER PUBLICATIONS

Intellectual Property Office, International Search Report for related UK Application No. GB1419975.6, dated May 11, 2015.

*Primary Examiner* — Robert Pezzuto (57) ABSTRACT

A combine harvester with a chassis, an implement coupled to the chassis, and a hydraulic system. The hydraulic system includes plural hydraulic cylinders coupled to the chassis and operative to cause movement of the implement, and a cylinder circuit coupled to the plural hydraulic cylinders. The cylinder circuit includes an actuable valve configured to enable hydraulic fluid flow through the plural hydraulic cylinders to enable the movement of the implement and a control system. The control system includes one or more sensors, each configured to provide a signal based on a motion of the chassis, and a controller configured to receive the signals from the one or more sensors and cause actuation of the actuable valve to cause the plural hydraulic cylinders to move the implement based on the signals to counter the motion of the chassis.

20 Claims, 6 Drawing Sheets

(56) References Cited

U.S. PATENT DOCUMENTS

| 7,870,709 B2 * | 1/2011 | Digman ............... A01D 75/287 |
| | | 56/10.2 E |
| 2002/0134558 A1 | 9/2002 | Bernhardt et al. |
| 2009/0212512 A1 | 8/2009 | Hoermann |
| 2010/0051298 A1 | 3/2010 | Smith et al. |

* cited by examiner

ACTIVE HEADER CONTROL

CROSS REFERENCE TO RELATED APPLICATION

This application claims the benefit of U.S. Provisional Application No. 62/068,039, filed Oct. 24, 2014, which is hereby incorporated by reference in its entirety.

BACKGROUND OF THE INVENTION

Field of Invention

The present disclosure is generally related to agricultural machines and, more particularly, combine harvesters.

Description of Related Art

Most agricultural machines, such as many combine harvesters, cannot travel fast with attached implements (e.g., headers). This is due to the fact that, after reaching a critical speed, the combine harvester may pitch so much that it becomes unsteerable, and travelling at such a high speed or higher may be dangerous and/or impossible. Such pitching may be caused by a lack of suspension on the combine harvester and a large moment of inertia of the combine with the attached header, where the header is extending outside of the combine harvester wheelbase. The initial excitation of the system may come from the road and/or the transmission. As the combine harvester speed increases, the pitching amplitude may also increase up to a critical level beyond which it is impossible to safely travel. Having a capability to travel at high speeds with an attached header may be important for operators of harvesters, who may not want to disengage the header (e.g., due to the amount of time consumed) when moving from one field to another field located a few miles away (or more) in areas sparsely populated.

OVERVIEW OF THE INVENTION

One aspect of the invention is directed to a combine harvester with a chassis, an implement coupled to the chassis, and a hydraulic system. The hydraulic system includes plural hydraulic cylinders coupled to the chassis and operative to cause movement of the implement, and a cylinder circuit coupled to the plural hydraulic cylinders. The cylinder circuit includes an actuable valve configured to enable hydraulic fluid flow through the plural hydraulic cylinders to enable the movement of the implement and a control system. The control system includes one or more sensors, each configured to provide a signal based on a motion of the chassis, and a controller configured to receive the signals from the one or more sensors and cause actuation of the actuable valve to cause the plural hydraulic cylinders to move the implement based on the signals to counter the motion of the chassis.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Corresponding reference characters indicate corresponding parts throughout the views of the drawings.

DESCRIPTION OF EXAMPLE EMBODIMENTS

Certain embodiments of an active header control system and method are disclosed that operate on an agricultural machine with a coupled implement. The active header control system controls the motion of the coupled implement to counteract the movement (e.g., pitch and/or roll) of a chassis of the agricultural machine to which the implement is coupled, such as to stabilize the agricultural machine. For instance, in the case of a combine harvester with a header coupled to a feeder house of the combine harvester, one embodiment of an active header control system comprises a control system and a hydraulic system. In one embodiment, the hydraulic system comprises one or more hydraulic cylinders (also known as hydraulic actuators) that are affixed to the feeder house and enable the movement of the header, and one or more cylinder circuits to control hydraulic fluid flow (e.g., the direction and/or flow rate) through the one or more cylinders. In one embodiment, the control system comprises one or more sensors to detect movement (e.g., pitch and/or roll) of the chassis, and a controller (e.g., electronic control unit, or ECU) that receives the signals from the sensors and actuates the one or more cylinder circuits (e.g., actuates a valve actuator, such as a solenoid, of one or more valves in the respective cylinder circuit, which causes movement of an internal spool or poppet that controls the flow of hydraulic fluid therein) to cause a change in direction and/or flow rate of the hydraulic fluid flow through the one or more hydraulic cylinders based on the signals from the one or more sensors. The change in flow may include stopping the flow to any side of the hydraulic cylinders. The change in the hydraulic fluid flow results in a raising or lowering of the coupled header, which is used to counteract the movement (e.g., pitch) of the chassis, canceling or decreasing the chassis movement. In some embodiments, the active header control system may detect rolling movement of the chassis and responsively counter the rolling movement by adjusting the header (e.g., in a rolling counter action).

Digressing briefly, customers (e.g., in possession or control of agricultural machines) generally either have to disengage the header if a higher speed of travel is desired, or otherwise, travel slowly with the header attached. Some conventional systems attempt to provide some cushioning for the header in the form of a header passive suspension system. Such a suspension system typically consists of one or more hydraulic accumulators (acting as hydraulic springs), and which are hydraulically connected to the hydraulic actuators of the header. During travel, the passive suspension system allows independence between chassis motion and header movement. However, depending on certain factors, such as the combine natural frequencies (which depend on the combine harvester configuration such as weight distribution, amount of grain in the tank, header weight, tire arrangement such as dual versus single, tire pressure, etc.) and the excitation frequency (which may depend on combine harvester travel speed and/or road profile and/or combine harvester driveline natural frequencies), the passive suspension system may improve the ride by cushioning the header oscillations, or may increase such oscillations and thus decrease ride quality. For instance, if the excitation frequency gets close to the natural frequency of the combine harvester and/or natural frequency of the suspended header, the risk of excessive combine harvester pitching increases significantly. Note that it is possible to develop a passive header suspension system that is based on mechanical springs. As an alternative approach, certain embodiments of an active header control system may enable the combine harvester to travel at higher speeds with the attached header using many components that are currently deployed on combine harvesters, providing for a relatively inexpensive solution. Enabling higher speeds of travel with the header still attached may be important for combine harvesters where the operator does not want to disengage the header (e.g., too time consuming) when moving between fields (e.g., located a few miles away or more), particularly in sparsely populated areas.

Having summarized certain features of active header control systems of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on an agricultural machine with a front-coupled implement, and in particular, a combine harvester with a front-coupled header, certain embodiments of an active header control system (or the principles thereof) may be beneficially deployed in other machines (in the same or other industries) where an implement is or is not utilized. For instance, certain embodiments of an active header control system may be deployed for active implement control, such as for active header control on windrowers, front and rear active hitch control on tractors, active bucket control on a backhoe-loader, active bucket control on a wheel-loader, etc. Similarly, certain embodiments of an active header control system (or the principles thereof) may be beneficially deployed to actively control suspended axles, such as active rear axle control on combine harvesters with rear suspension, active front axle control on tractors with front suspension, windrower rear axle active control, automotive vehicles active suspension, trailer trucks active suspension, among other applications. Also, although a focus of the described embodiments is on the agricultural equipment industry, it should be appreciated by one having ordinary skill in the art that certain embodiments of active header control systems may be deployed for other industries, such as the construction equipment industry. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Figure 1:
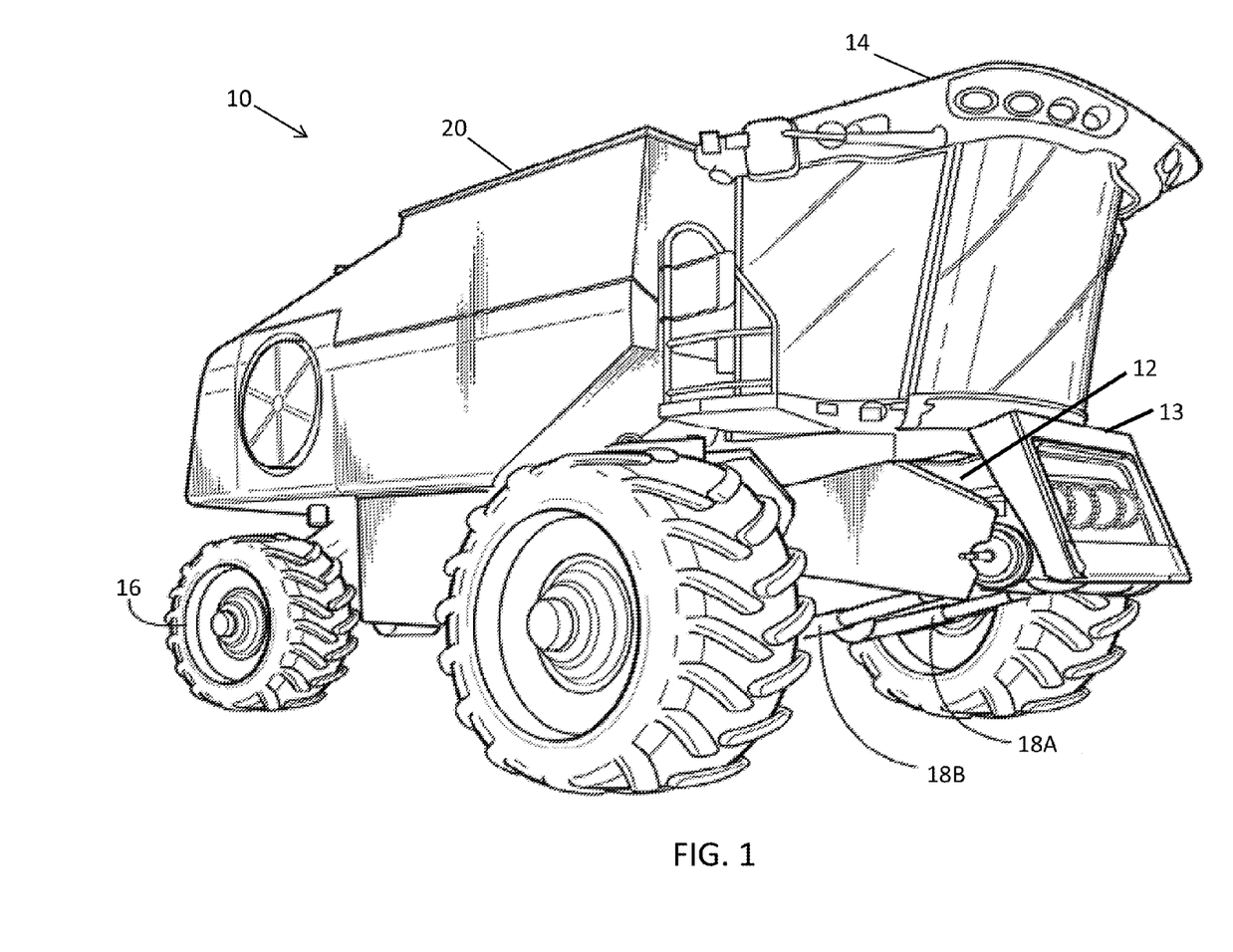
FIG. 1 is a schematic diagram that illustrates, in front perspective view, an example agricultural machine in which an embodiment of an example active header control system may be implemented.

Reference is made to FIG. 1, which illustrates an example agricultural machine embodied as an example combine harvester 10, which utilizes an embodiment of an active header control system. One having ordinary skill in the art should appreciate in the context of the present disclosure that the example combine harvester 10 is merely illustrative, and that other machines with coupled implements may deploy certain embodiments of an active header control system. The example combine harvester 10 is shown in FIG. 1 without a header, and from front to back, comprises a feeder house 12 and an operator cab 14 that is mounted to a chassis supported by wheels 16. In some embodiments, the forward end of the feeder house 12 comprises a lateral tilt frame 13, which provides for a controlled rolling movement (e.g., independent of the up and down feeder house movement) of the coupled header, as is known. In some embodiments, the lateral tilt frame 13 may be connected to another substructure attached to the chassis or the feeder house, or omitted in some embodiments. In some embodiments, instead of wheels, other or additional forms of travel may be used, such as tracks. Also shown are plural hydraulic cylinders 18 (e.g., 18A and 18B, or also referred to herein as hydraulic actuators) that are affixed, in one embodiment, to the underside of the feeder house 12 (and/or to an element or substructure rigidly connected thereto) on one end and to the chassis (and/or other element or substructure rigidly connected to the chassis) on the other end in known manner. As is known, the feeder house 12 moves (e.g., up and down) based on actuation of the hydraulic cylinders 18, which cause a detachably coupled header to also be raised and lowered. Note that in some embodiments, a single hydraulic cylinder 18 (e.g., 18A or 18B) may be used. In some embodiments, the lateral tilt frame 13 may be rotated relative to the feeder house 12 (e.g., via actuation of one or more cylinders coupled to the frame 13 and the feeder house 12 or any substructure between these two structures), causing a rolling movement of the header, which is attached to the feeder house 12 though the lateral tilt frame 13, as is known.

In general the combine harvester 10 cuts crop materials (e.g., using the header), wherein the cut crop materials are delivered to the front end of the feeder house 12. Such crop materials are moved upwardly and rearwardly within and beyond the feeder house 12 (e.g., by a conveyer) until reaching a processor comprising a thresher rotor. In one embodiment, the thresher rotor may comprise a single, transverse rotor, such as that found in a Gleaner® Super Series Combine by AGCO. Other designs may be used, such as axial-based, single or twin rotor, or hybrid designs. The thresher rotor processes the crop materials in known manner and passes a portion of the crop material (e.g., heavier chaff, corn stalks, etc.) toward the rear of the combine harvester 10 and another portion (e.g., grain and possibly light chaff) through a cleaning process in known manner. In the processor, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials and/or other material other than grain or MOG are generally retained by the concave assemblies and the grate assemblies and are discharged out from the processor and ultimately out of the rear of the combine harvester 10. The cleaned grain that drops to the bottom of the cleaning system is delivered by a conveying mechanism that transports the grain to a well-known elevator mechanism (not shown), which conveys the grain to a grain bin 20 located at the top of the combine harvester 10. Any remaining chaff and partially or unthreshed grain is recirculated through the processor via a tailings return conveying mechanism. As combine processing is known to those having ordinary skill in the art, further discussion of the same is omitted here for brevity.

Figure 2:
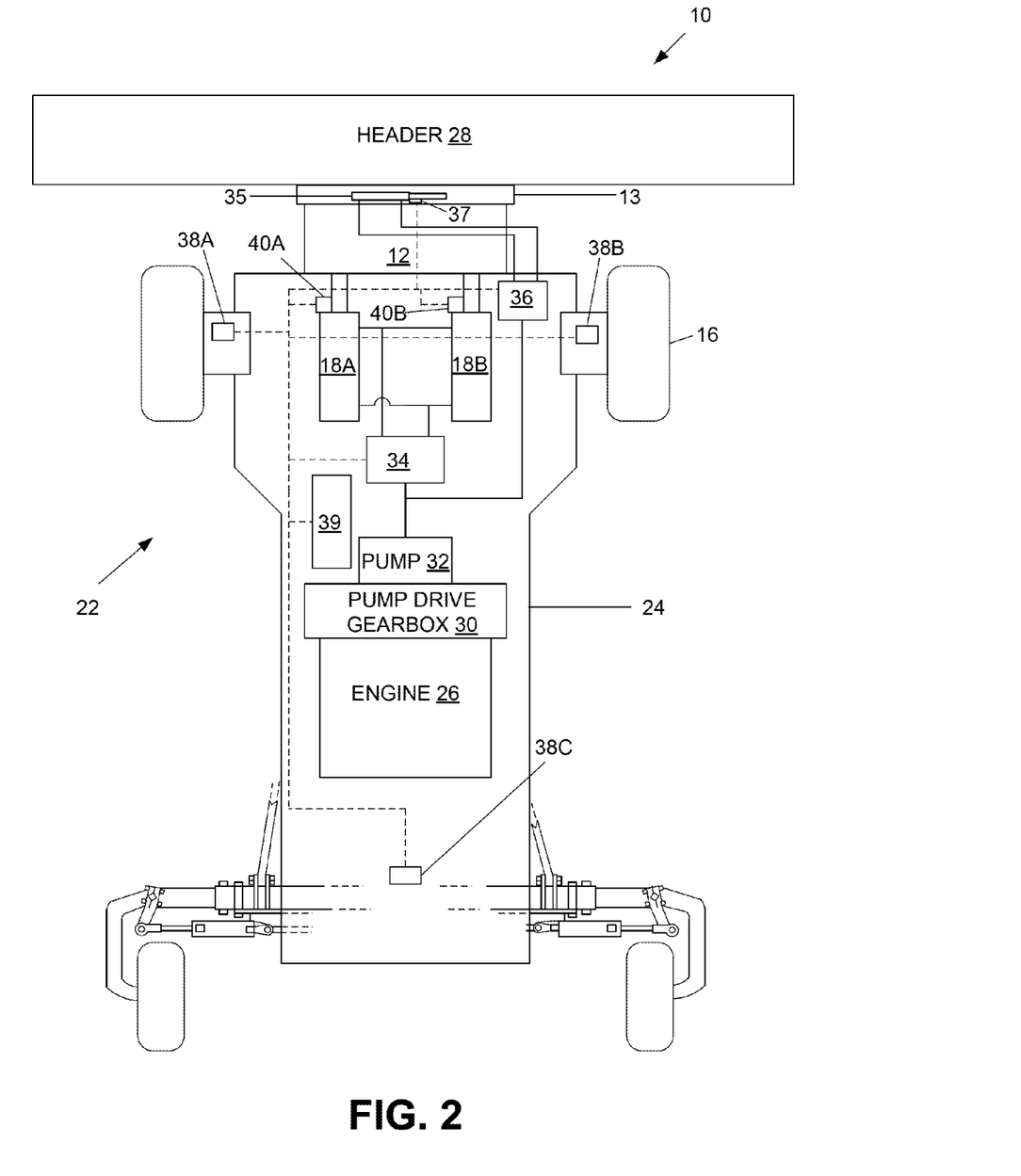
FIG. 2 is a schematic diagram that illustrates, in top fragmentary plan view, an embodiment of an example active header control system.

FIG. 2 is a schematic diagram that illustrates, in top fragmentary plan view, an embodiment of an example active header control system 22 of the combine harvester 10 that is used to achieve active header control. It should be appreciated by one having ordinary skill in the art in the context of the present disclosure that the active header control system 22 depicted in FIG. 2 is merely illustrative, and that some embodiments may use additional or fewer components in a different arrangement to achieve a similar function. The combine harvester 10 may include a chassis or frame 24 with fore and aft axles and supported by the wheels 16 for movement across a field. The chassis 24 supports a rearwardly spaced compartment housing an internal combustion engine 26. The chassis 24 also supports a ground drive system that, in one embodiment, when powered by the engine 26, causes rotation (e.g., differential rotation) of the wheels 16 as is known in the art. In some embodiments, other driveline mechanisms may be used. The combine harvester 10 also comprises a coupled working implement, schematically depicted in FIG. 2 as a harvesting header 28, which is coupled to the chassis 24 (e.g., coupled directly or indirectly to the lateral tilt frame 13 of the feeder house 12) in a manner known and understood by those skilled in the art. In some embodiments, the lateral tilt frame 13 may be omitted and the harvesting header 28 is coupled (e.g., directly) to the feeder house 12. The header 28 may be configured as a modular unit and consequently may be disconnected for removal from the feeder house 12.

In one example implementation, the engine 26 is coupled to a pump drive gearbox 30, which in turn is coupled to a hydraulic pump 32. In some implementations, the pump 32 may be directly coupled to the engine 26 or indirectly via a belt, pulley, chains, etc. The pump drive gearbox 30 uses the power of the engine 26 to drive the hydraulic pump 32. In one embodiment, the pump 32 provides for pressurized, hydraulic fluid flow to a hydraulic system comprising, in one embodiment, a cylinder circuit 34 and the plural hydraulic cylinders 18A, 18B. In some embodiments, the hydraulic system may comprise one or more additional hydraulic cylinders, such as hydraulic cylinder 35, and a cylinder circuit 36 that controls the fluid flow from the pump 32 to the hydraulic cylinder 35. The hydraulic cylinder 35 may be actuated by the cylinder circuit 36 to control the lateral tilt frame 13 in a manner that enables a rolling movement of the header 28. Although a single hydraulic cylinder 35 is depicted in FIG. 2 to achieve the aforementioned rolling movement, plural hydraulic cylinders may be used in some embodiments to achieve the rolling movement. The hydraulic cylinder 35 may be located in the frame 13 (e.g., coupled between the frame 13 and the feeder house 12 or between other substructures that may be located between the frame 13 and the feeder house 12). In some embodiments, the hydraulic system may comprise additional, or fewer, components. As depicted in FIG. 2, the cylinder circuit 34 is arranged to control the hydraulic fluid flow in both hydraulic cylinders 18A, 18B by coupling each corresponding port connection of the hydraulic cylinders 18A, 18B (e.g., in tandem arrangement, as is known). In some embodiments, plural cylinder circuits may be deployed to control hydraulic fluid flow through the respective hydraulic cylinders 18A, 18B. The pump 32, cylinder circuit 34, and hydraulic cylinders 18A, 18B are coupled to each other via a fluidic medium, such as hydraulic tubing, hydraulic hoses, etc. Similarly, the pump 32, cylinder circuit 36, and hydraulic cylinder 35 (or hydraulic cylinders) are coupled to each other via a fluidic medium, such as hydraulic tubing, hydraulic hoses, etc. In some embodiments, a single hydraulic cylinder 18 (e.g., 18A or 18B) may be used. In some embodiments, multiple hydraulic pumps may be used (e.g., one to drive the feeder house 12 up and down and another to drive the lateral tilt frame 13).

In one embodiment of operation, the power of the engine 26 is transferred to the hydraulic pump 32 via the pump drive gearbox 30. The pump 32 provides pressurized hydraulic fluid flow to the hydraulic cylinders 18 via the cylinder circuit 34, which in turn controls whether the hydraulic fluid is allowed to pass to the hydraulic cylinders 18, and further to control the direction and/or flow rate of hydraulic fluid flow through the hydraulic cylinders 18. For instance, a flow of hydraulic fluid in one direction through the hydraulic cylinders 18 enables the raising of the header 28, whereas a flow of hydraulic fluid in another direction through the hydraulic cylinders 18 enables the lowering of the header 28. In some embodiments, the pump 32 provides pressurized hydraulic fluid flow to the hydraulic cylinder 35 (or cylinders (e.g., in tandem), though one cylinder is referenced hereinafter) via the cylinder circuit 36, which in turn controls whether the hydraulic fluid is allowed to pass to the hydraulic cylinder 35, and further to control the direction and/or flow rate of hydraulic fluid flow through the hydraulic cylinder 35. For instance, a flow of hydraulic fluid in one direction through the hydraulic cylinder 35 enables the rolling of the header 28 to one side, whereas a flow of hydraulic fluid in another direction through the hydraulic cylinders 35 enables the rolling of the header 28 to the opposing side. Note that reference to rolling to one side or another includes an orientation of a viewer looking forward from the rear of the combine harvester 10, where the header 28 can be lowered (or raised) on the left hand side (or right hand side) of the combine harvester 10 with respect to the right hand side (or left hand side). Stated otherwise, the reference to rolling to one side or another refers to a rotation relative to a neutral longitudinal axis of the chassis or feeder house 12 (e.g., perpendicular to the feeder house pivot axis).

Also shown in FIG. 2 is a control system, which in one embodiment comprises one or more sensors 38 (e.g., three (3) shown, including sensors 38A, 38B, and 38C) that sense motion of the chassis 24, and one or more controllers, such as controller 39 (e.g., electronic control unit or ECU) that receives signals (e.g., over a wired and/or wireless medium) from the sensors 38 and switchably configures the cylinder circuit 34 (and/or cylinder circuit 36) to control the hydraulic fluid flow through the hydraulic cylinders 18 (and/or hydraulic cylinder 35). For instance, the cylinder circuits 34 and 36 may each comprise a hydraulic valve. In one embodiment, each hydraulic valve of the cylinder circuits 34 and 36 comprises an internal spool or poppet and valve actuator, such as a solenoid or other type of valve actuator, to actuate the spool or poppet. Signaling from the controller 39 to the valve actuator causes movement of the spool or poppet in known manner, which in turn causes a change in hydraulic fluid flow therein. Note that although plural sensors 38 are shown, it should be appreciated by one having ordinary skill in the art in the context of the present disclosure that fewer (e.g., one) or additional sensors may be used. The sensors 38 are used to sense motion of the chassis 24, which may include the pitch and/or roll of the chassis 24. In one embodiment, the sensors 38 comprise accelerometers, and are arranged fore and aft, with the sensors 38A, 38B disposed on, or proximal to, the front axle of the chassis 24 and/or the respective left and right front wheels 16, and the sensor 38C disposed on the chassis 24, proximal to both the centerline of the chassis 24 and the rear axle. In some embodiments, a different axle arrangement may be used, and the sensors 38 may be configured to best detect the motion of the chassis 24. Note that the manner of arrangement depicted in, and described herein in association with, FIG. 2, is one example among many other examples of arrangements.

In some embodiments, the sensors 38 may include (in the depicted arrangement or in other locations and/or configurations or quantities) any one or a combination of accelerometers, gyroscopes, a radar device, one or more laser devices, or a global navigational satellite systems (GNSS) receiver. In some embodiments, one or more additional sensors 40 (e.g., 40A, 40B) may be used to sense the relative position of the pistons in each cylinder barrel of the hydraulic cylinders 18A, 18B, respectively, and/or sense any other parameter that may be used to calculate the relative position of the pistons in each cylinder barrel of the hydraulic cylinders 18A, 18B respectively, such as an angle of the feeder house 12 with respect to the chassis 24. Similarly, in some embodiments, one or more additional sensors 37 (e.g., one shown for illustration) may be used to sense the relative position of the piston in the cylinder barrel of the hydraulic cylinder 35 or any other parameter that may be used to calculate the relative position of the piston in each cylinder barrel of the hydraulic cylinder 35. The sensed relative positions may be fed back to the controller 39 to enable adjustment (e.g., by the controller 39 via the associated cylinder circuit 34 and/or 36) of the hydraulic cylinders 18 and/or 35 to a set or neutral position, enabling a more complete stroke range of the hydraulic cylinders 18 and/or 35 to facilitate oscillation compensation or mitigation operations of certain embodiments of the active header control system. The controller 39 is configured to receive the signals from the sensors 38 and determine the amount of pitch (and/or in some embodiments, the amount of roll) of the chassis 24. For instance, information in the signals from the sensors 38 may comprise local point accelerations and/or velocities, angle and magnitude information regarding the pitch motion (and/or roll motion) of the chassis 24, among other information in some embodiments. The controller 39, or other signal processing devices coupled thereto, may process (e.g., remove or mitigate noise, amplify, digitize, etc.) the signals, determine the overall pitch (and/or roll) of the chassis 24, and provide a signal or signals to the cylinder circuit 34 and/or cylinder circuit 36 to cause actuation of one or more valves of the cylinder circuits 34 and/or 36.

The actuation of the cylinder circuit 34 (and/or cylinder circuit 36) in turn results in a change in fluid flow (e.g., a change in direction and/or flow rate) through the hydraulic cylinders 18 (and/or hydraulic cylinder 35) in a manner to compensate for the motion of the chassis 24. The change in fluid flow through the hydraulic cylinders 18 results in either a raising or lowering of the header 28. For instance, if the controller 39 determines, based on the signals from the sensors 38, that the front (or rear, for an embodiment using a rear-coupled header) of the chassis is pitching downward, the correction or compensation involves causing the header 28 to move downward. Such a move of the header 28 causes header reaction forces acting on the chassis 24 to push the front (or rear, for an embodiment using a rear-coupled header) of the chassis 24 upward and therefore mitigate or eliminate combine harvester pitch motion. If the controller 39 determines, based on the signals from the sensors 38, that the front (or rear, for an embodiment using a rear-coupled header) of the chassis is pitching upward, the correction or compensation involves causing the header 28 to move upward. If the controller 39 determines, based on the signals from the sensors 38, that the chassis is beginning to roll, such as to the right, the controller 39 signals (e.g., directly or indirectly via a signal processing device or other device) to a valve actuator of the hydraulic (actuable) valve of the cylinder circuit 36 to actuate the internal spool (or poppet), causing a change in fluid flow through the cylinder circuit 36 (e.g., through the resultant opening or closing of ports of the actuable valve of the cylinder circuit 36) to achieve a compensatory rolling motion of the header 28 to the right. Such a compensatory or countering motion results in a left reaction moment acting on the chassis 24 that counters (e.g., limits or eliminates) the rolling motion of the chassis 24. In some embodiments, the controller 39 may cause actuation based in addition on signals fed back from the sensors 40, such as to ensure the movement of the header 28 is maintained approximately in a neutral position (e.g., the piston is in the middle of the cylinders 18) or in a set position. Similarly, in some embodiments, the controller 39 may cause actuation based in addition on signals fed back from the sensor 37, such as to ensure the movement of the header 28 is maintained approximately in a neutral position (e.g., the piston is in the middle of the cylinders 35) or in a set position.

Note that the communication medium for the controller 39 and sensors 37, 38, and 40, including the connections made to the valve actuators of the cylinder circuits 34 and 36, comprises multiple independent (e.g., twisted pair) wiring of a wiring harness that is depicted using dashed lines in FIG. 2 according to a logical CAN bus configuration (e.g., CAN ISO 11988, ISO 11783, etc.), wherein the connected components are nodes (e.g., addressable, such as via J1939 or other mechanisms) along the bus. It should be appreciated by one having ordinary skill in the art that other forms of communication may be used in some embodiments, such as an arrangement complying with RS232, among others well known to those having ordinary skill in the art.

Figure 3:
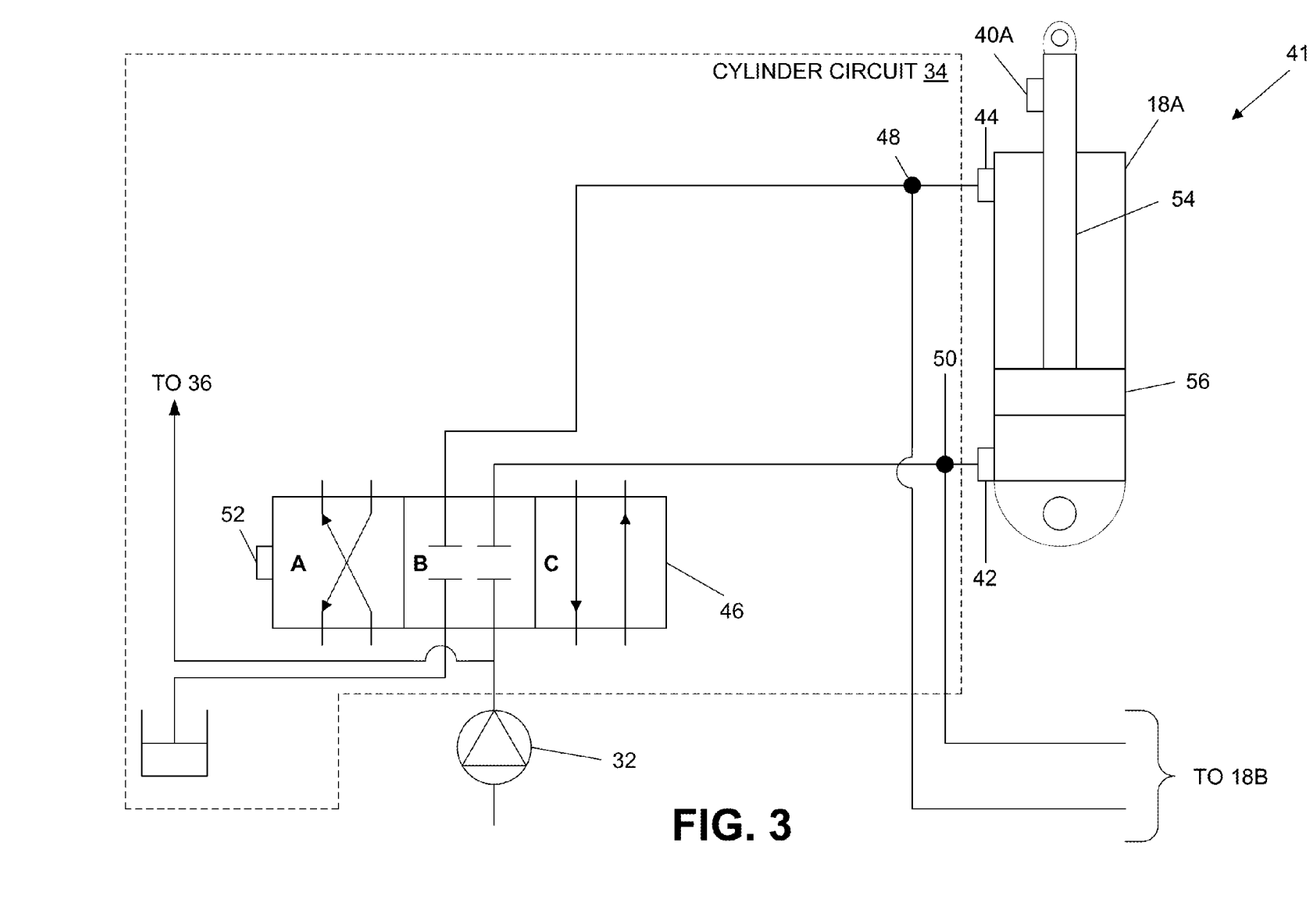
FIG. 3 is a schematic diagram that illustrates an example hydraulic system in a neutral configuration of an embodiment of an active header control system.

Having generally described an example arrangement and operation of an embodiment of an active header control system 22, attention is directed to FIG. 3, which illustrates an embodiment of select portions of a hydraulic system 41, the components of which are generally shown in FIG. 2. Absent from the discussion of FIG. 3 below are other portions of the hydraulic system 41, such as the hydraulic cylinder 35 and cylinder circuit 36. In at least one embodiment, the operation of the hydraulic cylinder 35 and cylinder circuit 36 is the same or similar to that described for the hydraulic cylinder 18A and cylinder circuit 34, and hence, omitted here for brevity. The hydraulic system 41 comprises the cylinder circuit 34 that is coupled to, and controls, the hydraulic cylinder 18A (and hydraulic cylinder 18B) of the active header control system 22 (FIG. 2). In the example embodiment depicted in FIG. 3, the cylinder circuit 34 is coupled to multiple (e.g., two) ports 42, 44 of the hydraulic cylinder 18A and includes a multi-position, electrically-actuable valve 46 with a spool positioned in a neutral configuration ("B"). It should be appreciated by one having ordinary skill in the art, in the context of the present disclosure, that the example cylinder circuit 34 depicted in FIG. 3 is merely illustrative, and that in some embodiments, additional, fewer, and/or different components to achieve similar functionality may be used. Although shown and described herein using a single hydraulic cylinder 18A, the description below is easily and readily applied to the use of multiple cylinders (e.g., 18A, 18B), and hence discussion of the operation for the hydraulic cylinder 18B is omitted here for brevity except where noted below. For instance, in one embodiment, the hydraulic cylinder 18B (FIG. 2) is arranged in tandem to the hydraulic cylinder 18A via coupling from port connections 48, 50. Note that in some embodiments, a single hydraulic cylinder 18 (e.g., 18A or 18B) may be used. The hydraulic cylinder 18A is also coupled (e.g., fluidly coupled) to the cylinder circuit 34. The cylinder circuit 34 receives pressurized fluid flow from the discharge of the pump 32, and controls the manner of hydraulic fluid flow into and out of the hydraulic cylinder 18A based on the spool position of the valve 46. The valve 46 is coupled to the discharge of the pump 32. The hydraulic cylinder 18A, as is known, comprises a cylinder barrel that houses a rod 54 and piston 56 assembly and comprises inlet and outlet ports 42, 44. The cylinder barrel is closed on one end (cap end), and open on the other end (head end) to permit the rod 54 to slide in and out of the cylinder barrel. As is know, the rod 54 and the piston 56 assembly move due to the applied force (e.g., which is a function of the pressure and area differentials on both sides of the piston 56) on the piston 56 and the amount of the flow that is directed to the cylinder 18A. For instance, due to differences in the area on the sides of the piston 56, the hydraulic fluid flow directed to the head end generates a higher speed of the piston 56 than the same amount of hydraulic fluid directed to the cap end of the piston 56. For the same pressure of the hydraulic fluid, higher force is generated on the cap end than on the head end due to a larger area of the piston 56 on the cap end. Thus, the speed of the piston 56 depends on the flow rate and the effective area of the piston. The force generated by the piston 56 depends on both the pressure difference on both sides of the piston 56 and the difference in effective area on each side of the piston 56. The hydraulic fluid flow to and out of the hydraulic cylinder 18A is controlled by the valve 46. The pressure in the cylinder chamber(s) is dependent on one or more parameters such as external load applied to the rod, inertia loads of the piston/rod assembly, the amount of flow directed by the valve 46, among other factors. In general, the rod 54 and piston 56 assembly move (e.g., extending the rod 54 past the head end of the cylinder barrel of the hydraulic cylinder 18A, or retracting the rod 54 to further within the cylinder barrel of the hydraulic cylinder 18A). The rod 54 of the hydraulic cylinder 18A may couple to one end to the feeder house 12 (FIG. 2), and the cap end of the hydraulic cylinder 18A may couple to the chassis 24 of the combine harvester 10 in known manner. Also shown is a well or reservoir to receive the hydraulic fluid in some configurations.

In one embodiment, the valve 46 comprises an actuable valve, such as a directional control valve, which in the depicted embodiment comprises a three-position valve, though not limited to a three-position valve in some embodiments. For instance, the valve 46 is switchably configured between spool positions "A," "B," and "C," based on signaling (e.g., over a wired or wireless medium) from the controller 39 (FIG. 2) to a valve actuator 52 (e.g., solenoid, or other known actuator of the valve 46) either directly, or via an intermediary device. In position "A," hydraulic fluid flow is in the direction from port 44 to port 42, causing a motion of the rod 54 and piston 56 to achieve retraction of the rod 54, and consequently lowering of the header 28 (FIG. 2) through coupling of the hydraulic cylinder 18A, the feeder house 12 (FIG. 2), and the header 28. Position "B" corresponds to a neutral position (e.g., no hydraulic fluid flow through the hydraulic cylinder 18A). In position "C," hydraulic fluid flow is in the direction from port 42 to port 44, causing a motion of the rod 54 and piston 56 to achieve extension of the rod 54, and consequently raising of the header 28 through coupling of the hydraulic cylinder 18A, the feeder house 12 (FIG. 2), and the header 28. Though the valve 46 (e.g., spool or poppet) is shown actuated with an electrical valve actuator 52 (e.g., solenoid), in some embodiments, other forms of control may be used such as pneumatic or hydraulic control, hybrid (e.g., electro-hydraulic) control, among others. In some embodiments, the sensor 40A may be coupled to (or located proximal to) the rod 54, enabling piston positioning (e.g., relative to the cylinder barrel) information to be sensed.

Figure 4A:
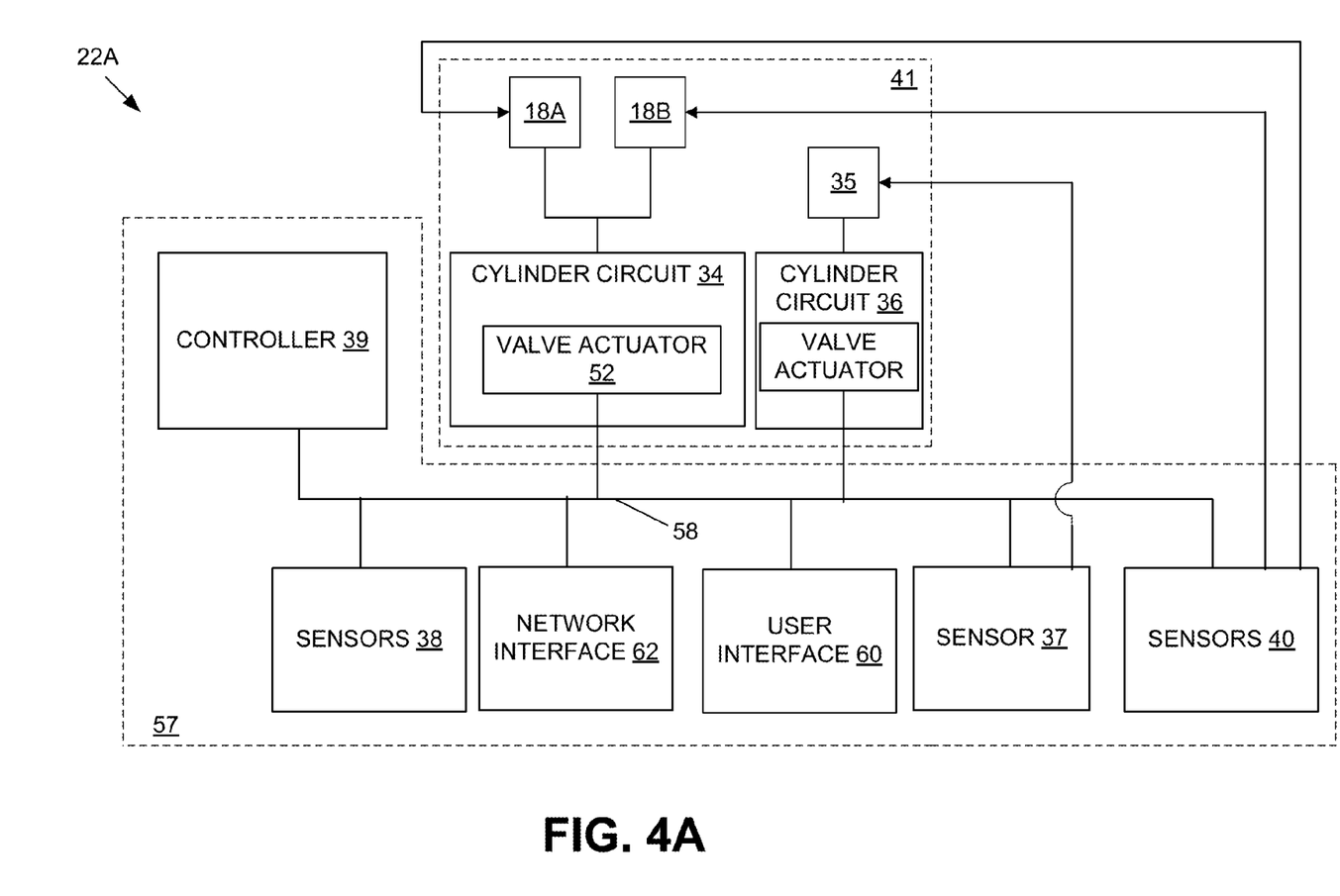
FIG. 4A is a block diagram of an embodiment of an example active header control system.

Referring now to FIG. 4A, shown is a schematic diagram that illustrates an embodiment of the active header control system 22A. It should be appreciated within the context of the present disclosure that some embodiments may include additional components or fewer or different components, and that the example depicted in FIG. 4A is merely illustrative of one embodiment among others. The active header control system 22A comprises the hydraulic system 41 and a control system 57. The hydraulic system 41, already described in association with FIG. 3, comprises in one embodiment the cylinder circuits 34 and 36 (with respective actuable valves comprising a valve actuator 52 for cylinder circuit 34 and a valve actuator for the cylinder circuit 36) coupled respectively to the hydraulic cylinders 18 (e.g., 18A and 18B) and 35. The control system 57 comprises, in one embodiment, one or more controllers (e.g., ECUs), such as the controller 39. The controller 39 is coupled via one or more networks, such as network 58 (e.g., a CAN network or other network, such as a network in conformance to the ISO 11783 standard, also referred to as "Isobus"), to other components of the control system 57, including the valve actuators of the respective actuable valves of the cylinder circuits 34 and 36, the sensors 38 and optionally the sensors 40 (coupled to, or proximal to, the hydraulic cylinders 18) and/or the sensor 37 (coupled to, or proximal to, the hydraulic cylinder 35), and in some embodiments, a user interface 60 (e.g., including a virtual terminal), and a network interface 62.

The user interface 60 may include one or more of a keyboard, mouse, microphone, touch-type display device, joystick, steering wheel, FNR lever, or other devices (e.g., switches, immersive head set, etc.) that enable input and/or output by an operator (e.g., to respond to indications presented on the screen or aurally presented, or in some embodiments, to enable input by the operator based on observation of the field conditions) and/or enable monitoring of machine operations. In some embodiments, the chassis motion-countering actions (e.g., raising or lowering the header 28 and/or rolling movement of the header 28) may be indicated on an operator screen or otherwise indicated to an operator (whether situated remotely or located in the cab 14, FIG. 1), such as to alert an operator of the impending and/or completed action and/or to solicit operator intervention before the action is taken.

The network interface 62 comprises hardware and/or software (e.g., radio and/or cellular modem) that enable wireless connection to one or more remotely located computing devices over a network (e.g., wireless or mixed wireless and wired networks). For instance, the network interface 62 may cooperate with browser software and/or other software of a controller to communicate with a server device over cellular links, among other telephony communication mechanisms and radio frequency communications, enabling remote monitoring or control of the combine harvester 10 (FIG. 1) and/or its associated functions. The network interface 62 may comprise MAC and PHY components (e.g., radio circuitry, including transceivers, antennas, etc.), as should be appreciated by one having ordinary skill in the art.

In one embodiment, the controller 39 is configured to receive and process information from the sensors 38 (and optionally, sensors 40 and/or 37 sensing, directly or indirectly, the position of the respective piston relative to the cylinder barrel of the hydraulic cylinders 18 and 35) and communicates a signal or signals to the cylinder circuits 34 and/or 36 (e.g., to the valve actuators of the actuable valves of the respective cylinder circuits) to cause the spool (or poppet) position to change (e.g., to change to position A, B, or C). The change in position of the spool or poppet of the actuable valve 46 of the cylinder circuit 34 enables a change in the direction (and/or flow rate) of hydraulic fluid flow, resulting in a raising or lowering of the coupled header 28 based on the information in the signals received by the sensors 38 (and optionally, sensors 40). Similarly, the change in position of the spool or poppet of the actuable valve of the cylinder circuit 36 enables a change in the direction and/or flow rate of the hydraulic fluid flow, resulting in a countering, rolling movement of the coupled header 28 (FIG. 2) based on the information in the signals received by the sensors 38 (and optionally, sensor(s) 37). In some embodiments, the countering movements enabled by the actuation of valves in the cylinder circuits 34 and 36 are performed at the same time to counter simultaneous pitch and roll movements of the chassis 24. Note that in some embodiments, a more rudimentary control mechanism may be used.

Figure 4B:
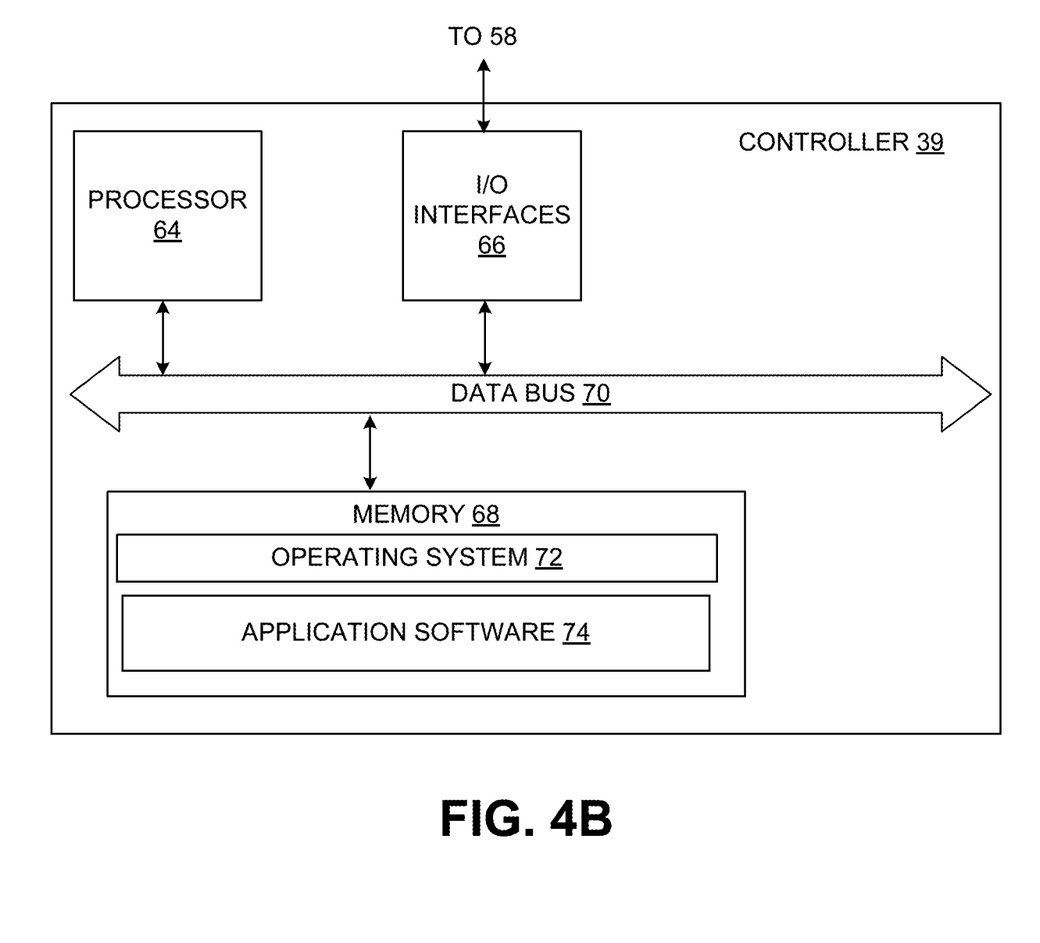
FIG. 4B is a block diagram of an embodiment of an example controller used in the example active header control system of FIG. 4A.

FIG. 4B further illustrates an example embodiment of the controller 39 shown in FIG. 4A. One having ordinary skill in the art should appreciate in the context of the present disclosure that the example controller 39 is merely illustrative, and that some embodiments of controllers may comprise fewer or additional components, and/or some of the functionality associated with the various components depicted in FIG. 4B may be combined, or further distributed among additional modules or controllers, in some embodiments. It should be appreciated that, though described in the context of residing in the combine harvester 10 (FIG. 1), in some embodiments, the controller 39, or all or a portion of its corresponding functionality, may be implemented in a computing device or system located external to the combine harvester 10. Referring to FIG. 4B, with continued reference to FIG. 4A, the controller 39 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 39. In one embodiment, the controller 39 comprises one or more processors, such as processor 64, input/output (I/O) interface(s) 66, and memory 68, all coupled to one or more data busses, such as data bus 70. The memory 68 may include any one or a combination of volatile memory elements (e.g., random-access memory RAM, such as DRAM, and SRAM, etc.) and nonvolatile memory elements (e.g., ROM, hard drive, tape, CDROM, etc.). The memory 68 may store a native operating system, one or more native applications, emulation systems, or emulated applications for any of a variety of operating systems and/or emulated hardware platforms, emulated operating systems, etc. In some embodiments, a separate storage device may be coupled to the data bus 70, such as a persistent memory (e.g., optical, magnetic, and/or semiconductor memory and associated drives).

In the embodiment depicted in FIG. 4B, the memory 68 comprises an operating system 72 and application software 74. It should be appreciated by one having ordinary skill in the art in the context of the present disclosure that the controller 39 may embody other mechanisms of control in some embodiments, such as a more rudimentary form of control where the operating system and application software are omitted. The application software 74 receives sensor input, and responds with one or more signals (sent wirelessly and/or over a wired medium, such as the network 58 to the valve actuator (e.g., solenoids) of the actuable valves of the cylinder circuits 34 and/or 36 to actuate the actuable valves (e.g., valve 46 and the valve of the cylinder circuit 36) to cause a change in spool position, and hence, a change in hydraulic fluid flow through the hydraulic cylinder(s) 18 and/or 35. The application software 74 uses the sensor input to determine the pitch of the chassis 24 (FIG. 2), and in some embodiments, the rolling motion of the chassis 24. The sensor input may also include information pertaining to a position of the pistons 56 (FIG. 3) relative to the respective cylinder barrel (FIG. 3, such as via sensors 40) of the hydraulic cylinders 18 (and/or relative piston position with respect to the cylinder barrel of the hydraulic cylinder 35 via sensor 37). For instance, the application software 74 receives the input from the sensors 40 (and/or sensor 37) to determine how much the hydraulic cylinders 18 (and/or hydraulic cylinder 35) can move and how much adjustment to the hydraulic cylinders 18 (and/or hydraulic cylinder 35) is needed to deliver a required compensatory movement. In some embodiments, the application software 74 may receive (e.g., sensor input) a feeder house position (e.g., angle) with respect to the chassis 24, and use that information to determine a relative position of the pistons 56 of the hydraulic cylinders 18 relative to the respective cylinder barrel. The application software 74 may provide, or facilitate, further processing of the sensor inputs, including filtering, amplification, analog-to-digital and digital-to-analog processing, among other processing. The application software 74 determines the counter-acting motion of the header 28. The counter-action may include determining the direction, such as whether upward or downward (and/or roll left or right), and in some embodiments, the speed, the acceleration, and/or the extent of the raising or lowering or rolling (e.g., raise and/or roll all of the way, or partially). For instance, for pitch counter measures, the sensor input may include a value of the acceleration, velocity, and/or the piston position of the hydraulic cylinders 18. The application software 74 may determine, based on the sensor input, if the position of the piston 56 (FIG. 3) is at the end of its stroke, prohibiting further movement and hence needing adjustment. The application software 74 may determine the need for adjustment in similar manner for the hydraulic cylinder 35 based on sensor input from the sensor 37. The piston position may be adjusted at times when the active header control system 22A is not engaged or activated, so the piston travel may be sufficient to achieve counter movement when needed. The counter action may also similarly include how much hydraulic fluid flow to provide through the hydraulic cylinder 35, such as whether to raise one end of the header 28 relative to another end (e.g., rolling motion).

Execution of the application software 74 may be implemented by the processor 64 under the management and/or control of the operating system 72. In some embodiments, the operating system 72 may be omitted and a more rudimentary manner of control implemented. The processor 64 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 39.

The I/O interfaces 66 provide one or more interfaces to the network 58 and other networks. In other words, the I/O interfaces 66 may comprise any number of interfaces for the input and output of signals (e.g., analog or digital data) for conveyance of information (e.g., data) over the network 58. The input may comprise input by an operator (local or remote) through the user interface 60, and/or input from signals carrying information from one or more of the components of the combine harvester 10 (FIG. 1), such as the sensors 37, 38 and/or 40, an associated controller, and/or the network interface 62, among other devices. Outputs may be provided to the cylinder circuits 34 and 36 via the network 58.

When certain embodiments of the controller 39 are implemented at least in part with software (including firmware), as depicted in FIG. 4B, it should be noted that the software (e.g., such as the application software 74) can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 39 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), relays, contactors, etc.

Figure 5:
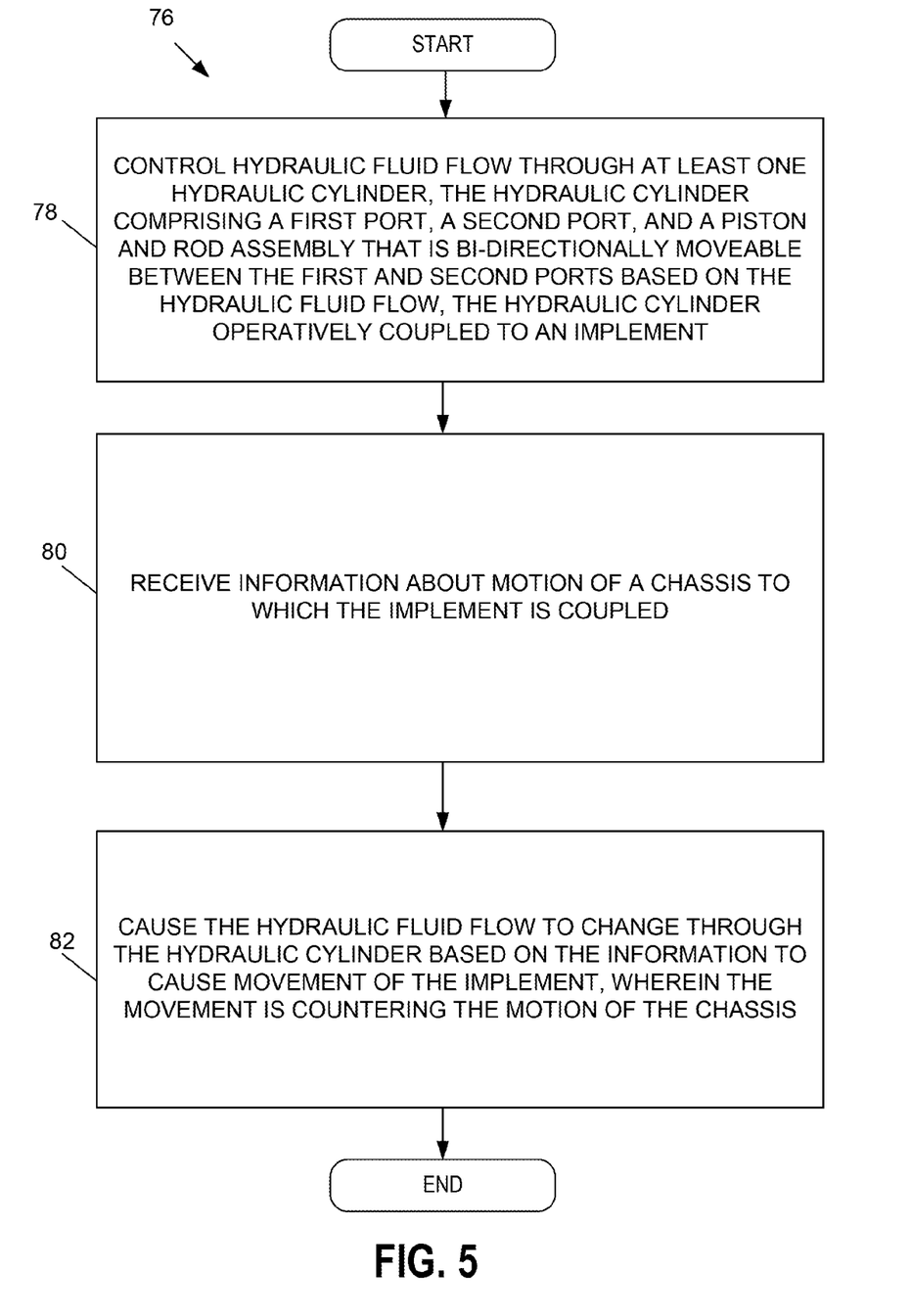
FIG. 5 is a flow diagram that illustrates an embodiment of an example active header control method.

In view of the above description, it should be appreciated that one embodiment of a method 76 of providing active header control, as depicted in FIG. 5, comprises: controlling hydraulic fluid flow through at least one hydraulic cylinder, the hydraulic cylinder comprising a first port, a second port, and a piston and rod assembly that is bi-directionally moveable between the first and second ports based on the hydraulic fluid flow, the hydraulic cylinder operatively coupled to an implement (78); receiving information about motion of a chassis to which the implement is coupled (80); and causing the hydraulic fluid flow to change through the hydraulic cylinder based on the information to cause movement of the implement, wherein the movement is countering the motion of the chassis (82).

Any process descriptions or blocks in flow diagrams should be understood as representing steps in the process, and alternate implementations are included within the scope of the embodiments in which functions may be executed out of order from that shown or discussed, as would be understood by those reasonably skilled in the art of the present disclosure.

Although emphasis has been placed on certain embodiments that use an implement, as noted previously, the principles described herein may be used for applications that do not involve an implement, such as in an automobile (e.g., car or truck). For instance, in one example, a semitrailer truck equipped with an air bag suspension system is enhanced by a relatively small auxiliary hydraulic system that may provide for active ride control. Such an auxiliary hydraulic system may comprise hydraulic actuators (e.g., with each hydraulic actuator placed at or near the center of each suspension air bag), an actuable valve, hydraulic accumulator, a hydraulic pump, and a hydraulic fluid carrying medium (e.g., hydraulic tubes, hydraulic hoses, etc.). The auxiliary hydraulic system may be controlled with a control system configured similarly to the system described herein that provides active ride control with an implement. The sensors may detect the movement of the unsuspended masses (e.g., wheels) and/or the vehicle chassis, with a controller of the control system adjusting the direction and/or flow rate of the hydraulic fluid through the hydraulic actuators to provide for a smooth ride of the vehicle (e.g., chassis). The hydraulic accumulator may serve as a temporary energy storage device that accommodates peak power demand. Such a solution may result in an optimal design (e.g., small size, minimal power requirements) of the auxiliary hydraulic system. As another example, for a vehicle such as a car, an active ride control operation may be performed with a similar auxiliary actuating system (e.g., hydraulic, electrical, and/or electro-magnetic-based). For instance, in one example car, a damper may be replaced with a small actuator (e.g., hydraulic-based, or other type of actuators) that may provide compensatory movement to assure a smooth ride. Such an auxiliary actuating system may be controlled with a control system in similar fashion to the system described herein. In effect, the chassis remains stable by the auxiliary active ride system prohibiting or reducing movement of the chassis (or suspended masses) during the ride in the direction of action of the suspension (e.g., vertical) and/or mitigating the movement of the chassis by reducing and smoothing accelerations in the direction of action of the suspension (e.g., in the vertical direction). In general, such embodiments may stabilize the chassis and/or suspended mass. For instance, the aforementioned embodiments may optimize the position of the chassis and/or accelerations of the chassis, stabilize the position (e.g., vertical position) of the chassis during a ride, stabilize the vertical position of suspended mass with respect to the ground/road, mitigate the vertical movement of the chassis by reducing and smoothing accelerations, and/or mitigate the movement of the chassis by reducing and smoothing accelerations in the direction of action of the suspension In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. An agricultural machine, comprising:
   a chassis;
   an implement mechanically coupled to the chassis;
   a hydraulic system, comprising:
      at least one hydraulic cylinder, comprising a first port, a second port, and a piston and rod assembly that is bi-directionally moveable between the first and second ports based on hydraulic fluid flow, each hydraulic cylinder coupled to the chassis and operative to cause movement of the implement; and
      a cylinder circuit coupled to the first and second ports of the at least one hydraulic cylinder, the cylinder circuit comprising an actuable valve that is switchably configurable to enable a change in the hydraulic fluid flow to enable the movement of the implement; and
   a control system, comprising:
      at least one sensor, configured to provide a signal based on a motion of the chassis; and
      a controller configured to receive the signal from the at least one sensor and cause actuation of the at least one hydraulic cylinder based on the signal to move the implement to counter the motion of the chassis.

2. The agricultural machine of claim 1, wherein the at least one sensor provides information corresponding to chassis pitch, wherein the controller is configured to cause actuation of the at least one hydraulic cylinder to lower the implement when one end of the chassis pitches downward.

3. The agricultural machine of claim 1, wherein the at least one sensor provides information corresponding to chassis pitch, wherein the controller is configured to cause actuation of the at least one hydraulic cylinder to raise the implement when one end of the chassis pitches upward.

4. The agricultural machine of claim 1, wherein the at least one sensor comprises an accelerometer.

5. The agricultural machine of claim 4, wherein the at least one sensor comprises a first sensor and a second sensor, respectively, connected directly or indirectly to the chassis, the first sensor proximal to a front axle and the second sensor proximal to a rear axle.

6. The agricultural machine of claim 1, wherein the at least one sensor provides information corresponding to a chassis rolling motion, and wherein the controller is further configured to cause actuation of an actuable valve of another cylinder circuit that is coupled to at least one other hydraulic cylinder proximal to a lateral tilt frame coupled to the chassis based on a signal to raise one end of the implement relative to the other end to counter the chassis rolling motion.

7. The agricultural machine of claim 6, further comprising at least one additional sensor proximal to at least one other hydraulic cylinder, the at least one additional sensor providing the controller a relative position of at least one piston of the respective other hydraulic cylinder with respect to each associated cylinder barrel or information to derive the relative positions in the respective cylinder barrels.

8. The agricultural machine of claim 1, wherein the agricultural machine comprises a combine harvester and the implement comprises a header.

9. The agricultural machine of claim 1, wherein the at least one sensor comprises one or a combination of: an accelerometer, a gyroscope, at least one laser device, a radar device, and a global navigation satellite system device.

10. The agricultural machine of claim 1, further comprising at least one additional sensor proximal to the at least one hydraulic cylinder, the at least one additional sensor providing the controller a relative position of a piston in each associated cylinder barrel or information to derive the relative position of the piston in each respective cylinder barrel.

11. The agricultural machine of claim 10, wherein the controller is further configured to cause actuation of the at least one hydraulic cylinder based on the relative position with respect to the associated cylinder barrel and a neutral or set position of the piston.

12. The agricultural machine of claim 1, wherein the actuable valve comprises a valve actuator that receives signals from the controller, the valve actuator enabling a change in spool or poppet position in the actuable valve.

13. A method, comprising:
   controlling hydraulic fluid flow through at least one hydraulic cylinder, the hydraulic cylinder comprising a first port, a second port, and a piston and rod assembly that is bi-directionally moveable between the first and second ports based on the hydraulic fluid flow, the hydraulic cylinder operatively coupled to an implement;
   receiving information about motion of a chassis to which the implement is coupled; and
   causing the hydraulic fluid flow to change through the hydraulic cylinder based on the information to cause movement of the implement, wherein the movement is countering the motion of the chassis.

14. The method of claim 13, wherein the information corresponds to chassis pitch.

15. The method of claim 14, wherein based on the information corresponding to a downward pitching motion of one end of the chassis, the causing the hydraulic fluid flow change causes the implement to be lowered.

16. The method of claim 14, wherein based on the information corresponding to an upward pitching motion of one end of the chassis, the causing the hydraulic fluid flow change causes the implement to be raised.

17. The method of claim 13, further comprising a lateral tilt frame coupled to at least one other hydraulic cylinders and at least one other cylinder circuit comprising an actuable valve that controls the hydraulic fluid flow through the at least one other hydraulic cylinders, wherein the information corresponds to chassis rolling motion, and wherein based on the information corresponding to the chassis rolling motion, causing hydraulic fluid flow change to cause the implement to be rolled to counter the chassis rolling motion.

18. The method of claim 13, wherein receiving the information comprises receiving the information from at least one sensors.

19. The method of claim 13, further comprising receiving information about a relative piston position with respect to a cylinder barrel of the hydraulic cylinder and causing the hydraulic fluid flow to change based on the information and a neutral or set position of the piston.

20. A combine harvesters comprising:
  a chassis;
  an implement coupled to the chassis;
  a hydraulic system, comprising:
    plural hydraulic cylinders coupled to the chassis and operative to cause movement of the implement; and
    a cylinder circuit coupled to the plural hydraulic cylinders and comprising an actuable valve configured to enable hydraulic fluid flow through the plural hydraulic cylinders to enable the movement of the implement; and
  a control system, comprising:
    at least one sensor, configured to provide a signal based on a motion of the chassis; and
    a controller configured to receive the signal from the at least one sensor and cause actuation of the actuable valve to cause the plural hydraulic cylinders to move the implement based on the signal to counter the motion of the chassis.

* * * * *